(12) United States Patent
Teunissen et al.

(10) Patent No.: US 11,654,606 B2
(45) Date of Patent: May 23, 2023

(54) COOLING APPARATUS AND METHOD FOR COOLING A CONTINUOUS STRIP

(71) Applicant: VMI HOLLAND B.V., Epe (NL)

(72) Inventors: Theodorus Gijsbertus Gerardus Teunissen, Epe (NL); Willen Marinus Van Beek, Epe (NL)

(73) Assignee: VMI HOLLAND B.V., Epe (NL)

( * ) Notice: Subject to any disclaimer, the term of this patent is extended or adjusted under 35 U.S.C. 154(b) by 20 days.

(21) Appl. No.: 15/733,119

(22) PCT Filed: Nov. 19, 2018

(86) PCT No.: PCT/NL2018/050772
§ 371 (c)(1),
(2) Date: May 20, 2020

(87) PCT Pub. No.: WO2019/098837
PCT Pub. Date: May 23, 2019

(65) Prior Publication Data
US 2020/0316839 A1 Oct. 8, 2020

(30) Foreign Application Priority Data
Nov. 20, 2017 (NL) ................................. 2019939

(51) Int. Cl.
*B29C 48/00* (2019.01)
*B29C 48/88* (2019.01)
(Continued)

(52) U.S. Cl.
CPC ............ *B29C 48/914* (2019.02); *B29C 48/92* (2019.02); *B29C 35/16* (2013.01); *B29C 48/08* (2019.02);
(Continued)

(58) Field of Classification Search
CPC .................. B29C 48/914; B29C 48/92; B29C 2948/9259; B29C 48/08;
(Continued)

(56) References Cited

U.S. PATENT DOCUMENTS 7,550,050 B2 6/2009 Lewin
9,610,622 B2 4/2017 Alken et al.
(Continued)

FOREIGN PATENT DOCUMENTS

CN 1732055 A 2/2006
CN 101716821 A 6/2010
(Continued)

OTHER PUBLICATIONS

Hwang et al., EPO Machine Translation of KR-101368545-B1 (Year: 2014).*
(Continued)

*Primary Examiner* — Seyed Masoud Malekzadeh
*Assistant Examiner* — John W Hatch
(74) *Attorney, Agent, or Firm* — Workman Nydegger

(57) ABSTRACT

The invention relates to a cooling apparatus and a method for cooling a continuous strip, wherein the cooling apparatus comprises a cooling drum and a guiding device for guiding the strip in a plurality of windings around the cooling drum, wherein the guiding device comprises first and second guiding elements, wherein each one of the first guiding elements forms a set with one of the second guiding elements, wherein the first guiding element of the set receives the strip from a first winding in a first winding direction and directs the strip in a first transition direction towards the second guiding element which receives the strip in a second transition direction and directs the strip into a consecutive winding in a second winding direction, wherein the first transition direction is different from the first winding direc-
(Continued)

tion and the second transition direction is different from the second winding direction.

31 Claims, 14 Drawing Sheets

(51) Int. Cl.
  *B29C 48/92* (2019.01)
  *B29C 48/08* (2019.01)
  *B29C 35/16* (2006.01)
(52) U.S. Cl.
  CPC ............... *B29C 2948/9259* (2019.02); *B29C 2948/92571* (2019.02)
(58) Field of Classification Search
  CPC .......... B29C 2948/92571; B29C 35/16; B29C 48/468; B29C 48/465; B29C 48/355; B29C 48/00
  USPC ............................................................. 264/237
  See application file for complete search history.

(56) References Cited

U.S. PATENT DOCUMENTS

| | | | |
|---|---|---|---|
| 9,901,964 B2 | 2/2018 | Kipping et al. | |
| 2006/0163780 A1 | 7/2006 | Lewin | |
| 2015/0135792 A1 | 5/2015 | Kipping et al. | |
| 2015/0231676 A1 | 8/2015 | Alken et al. | |

FOREIGN PATENT DOCUMENTS

| | | | | |
|---|---|---|---|---|
| CN | 202846868 U | | 4/2013 | |
| CN | 104470649 A | | 3/2015 | |
| CN | 109049452 A | | 12/2018 | |
| GB | 1500721 A | | 2/1978 | |
| GB | 1500721 A | * | 2/1978 | ............. B29C 35/16 |
| JP | H06106531 | * | 4/1994 | ............. B29B 11/00 |
| JP | H06106531 A | * | 4/1994 | |
| JP | S4746784 B2 | | 8/2011 | |
| KR | 101368545 B1 | * | 2/2014 | |
| KR | 101368545 B1 | * | 2/2014 | ............. B29C 48/07 |
| SU | 1494 A1 | * | 8/1924 | |
| SU | 2594 A1 | * | 8/1924 | |
| SU | 1494 A1 | | 9/1924 | |
| SU | 1191296 A1 | | 11/1985 | |
| SU | 1353611 A1 | | 11/1987 | |
| TW | 201636184 A | | 10/2016 | |
| WO | WO-2007108243 A1 | * | 9/2007 | ......... B29C 47/0021 |

OTHER PUBLICATIONS

Masao, EPO Machine Translation of JP H06106531 (Year: 1994).*
Tachibana, Machine Translation of WO-2007108243-A1 (Year: 2007).*
Search Report and Written Opinion from corresponding NL Application No. 2019939, dated May 16, 2018.
International Search Report and Written Opinion from PCT Application No. PCT/NL2018/050772, dated Apr. 11, 2019.
Russian Office Action from Corresponding Russian Application No. 2020115539, dated Feb. 17, 2022.
Taiwanese Office Action from Corresponding Taiwanese Application No. 107141193, dated Mar. 3, 2022.
Office Action and Written Opinion from corresponding Chinese Application No. 201880075020.1, dated Oct. 29, 2021.
Office Action from corresponding Japanese Application No. 2020-527793, dated Nov. 22, 2022.

* cited by examiner

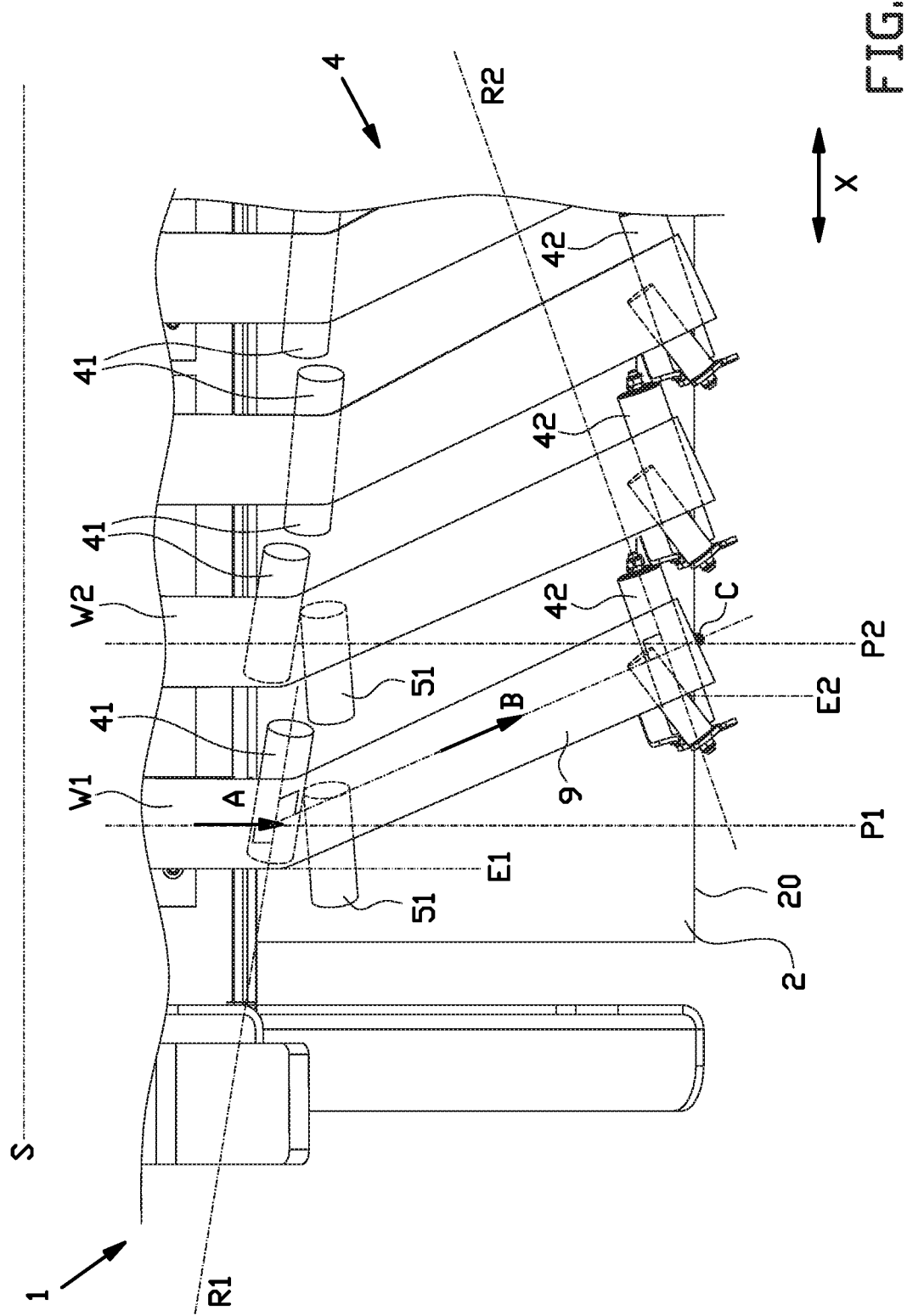

COOLING APPARATUS AND METHOD FOR COOLING A CONTINUOUS STRIP

BACKGROUND

The invention relates to a cooling apparatus and a method for cooling a continuous strip.

FIG. 13 shows a prior art cooling apparatus used to cool a freshly extruded continuous strip, in particular an apex or a bead filler for use in tire building. The known cooling apparatus comprises a cooling drum with a circumferential cooling surface for receiving a plurality of windings of the continuous strip and a set of crowned steering rollers arranged coaxially at the top of the cooling apparatus above said cooling drum. The continuous strip is guided from the cooling surface over one of the steering rollers and back onto the cooling surface with each winding. The set of steering rollers is arranged to be placed at an adjustable angle to the rotation axis of the cooling drum to set the pitch of the windings.

SUMMARY OF THE INVENTION

A disadvantage of the known cooling apparatus is that the steering rollers are increasingly offset relative to the surface of the cooling drum. As the distance between the point where the continuous strip leaves the cooling surface and where it runs over a respective one of the steering rollers can vary considerably, the distance over which the continuous strip is unguided is also considerable. Consequently, the continuous strip may behave differently and unpredictably during the winding. In particular, the steering rollers may pull on the continuous strip in the axial direction while said continuous strip is still supported on the cooling surface, causing the continuous strip to slide and/or deform unpredictably. Moreover, the continuous strip slowly stiffens as it cools down during its stay on the cooling drum. The continuous strip therefore behaves differently when winding over the later steering rollers with respect to the windings over the earlier steering rollers. In some cases, the continuous strip may run off to the side uncontrollably and stick to adjacent windings.

It is an object of the present invention to provide a cooling apparatus and a method for cooling a continuous strip, wherein the winding can be more accurately controlled.

According to a first aspect, the invention provides a cooling apparatus for cooling a continuous strip, wherein the cooling apparatus comprises a cooling drum with a cylindrical cooling surface that extends in a circumferential direction and has a rotation axis concentric to the cooling surface and extending in an axial direction, wherein the cooling apparatus further comprises a guiding device for guiding the continuous strip in a plurality of windings around the cooling surface, wherein the guiding device comprises first guiding elements and second guiding elements, wherein each one of the first guiding elements forms a set with one of the second guiding elements to guide the continuous strip in a transition from a first winding to a consecutive winding of the plurality of windings, wherein the first guiding element of the set is arranged for receiving the continuous strip from the first winding in a first winding direction and for directing the continuous strip in a first transition direction, wherein the second guiding element of the set is arranged for receiving the continuous strip in a second transition direction and for directing the continuous strip into the consecutive winding in a second winding direction, wherein the first transition direction is different from the first winding direction and the second transition direction is different from the second winding direction.

Hence, the continuous strip can be directed from the first winding into the consecutive winding between the first guiding element and the second guiding element of the set in a controlled manner. Moreover, it can be prevented that the change in direction of the continuous strip between the first guiding element and the second guiding element of the set negatively affects the continuous strip upstream of the first guiding element and downstream of the second guiding element. In particular, the first guiding element allows for a precise receiving of the continuous strip from the cooling drum and the second guiding element allows for a precise placement of the continuous strip back onto the cooling drum. The continuous strip can be directed directly from the first guiding element to the second guiding element or indirectly via one or more further guiding element of the set to the second guiding element.

In a preferred embodiment, the first guiding element of the set is arranged for directing the continuous strip in the first transition direction towards the second guiding element of the set and wherein the second guiding element of the set is arranged for receiving the continuous strip from the first guiding element of the set in the second transition direction, wherein the second transition direction is the first transition direction. Hence, the second guiding element can receive the continuous strip from the first guiding element in the same direction that was given to the continuous strip at said first guiding element.

Alternatively, the guiding device comprises one or more third guiding elements between the first guiding element and the second guiding element of each set, wherein the one or more third guiding elements are arranged for receiving the continuous strip in the first transition direction from the first guiding element and for directing the continuous strip towards the second guiding element in the second transition direction. Hence, the second guiding element can receive the continuous strip from the first guiding element in a slightly different direction than the direction that was given to the continuous strip at said first guiding element. In particular, because of the presence of the third guiding element, the twist or deflection of the continuous strip at the first guiding element and/or the second guiding element can be slightly reduced to prevent axial shifting or shear deformation.

In an embodiment the continuous strip has a longitudinal direction, wherein the first guiding elements and the second guiding elements are arranged for twisting the continuous strip about the longitudinal direction thereof prior to directing the continuous strip from the first winding direction into the first transition direction and from the second transition direction into the second winding direction. By twisting the continuous strip prior to changing its direction, the continuous strip can be placed in an optimal orientation for the subsequent deflection of said continuous strip from the first winding direction into the first transition direction and from the second transition direction into the second winding direction.

In a further embodiment the first winding direction and the second winding direction are tangent to the cooling surface. Hence, the continuous strip can be received from the cooling surface along a straight line and placed back onto the cooling surface along a straight line.

In a preferred embodiment thereof the first guiding elements are at a first distance from the cooling surface in the first winding direction, wherein the first distance is the same or substantially the same for all first guiding elements. Additionally, or alternatively, the second guiding elements are at a second distance from the cooling surface in the second winding direction, wherein the second distance is the same or substantially the same for all second guiding elements. By keeping the distances the same, the behavior of the continuous strip can be kept substantially the same for each winding.

In a further embodiment the first winding direction extends in a first winding plane and the second winding direction extends in a second winding plane parallel to yet spaced apart from the first winding plane. The continuous strip can thus be received at the first guiding element in the same winding plane in which the first winding extends and can be placed back onto the cooling drum while already extending in the second winding plane.

In a preferred embodiment thereof the first winding plane and the second winding plane extend perpendicular to the rotation axis. Consequently, the continuous strip can be wound around the cooling drum in 'straight' windings, meaning that each winding extends in a single plane, wherein the continuous strip is transitioned from the first winding plane to the second winding plane between the first guiding element and the second guiding element only. Hence, the continuous strip can be wound neutrally or substantially neutrally about the cooling drum.

In a further embodiment the second guiding element of the set is offset with respect to the first guiding element of the set in the axial direction. As a result, the continuous strip can be transported from the first winding to the consecutive winding when moving from the first guiding element to the second guiding element.

In a further embodiment the second guiding element of the set is offset with respect to the first guiding element of the set in the circumferential direction. By offsetting the guiding elements in the circumferential direction, the change in direction of the continuous strip can be made less abrupt.

In a preferred embodiment thereof the first guiding element and the second guiding element of the set are spaced apart in the circumferential direction over a spacing angle in the range of twenty to sixty degrees, preferably thirty to forty degrees. At such spacing angle, the continuous strip can be made to transition gradually, while the continuous strip is still in contact with the cooling surface during a sufficient part of the remaining circumference.

In a further embodiment thereof the first guiding element and the second guiding element of the set define a linear transition path for the continuous strip, wherein the first guiding element and the second guiding element of the set are positioned relative to the cooling surface so that the transition path is completely spaced apart from the cooling surface. The transition can thus take place completely independently from the cooling surface. In particular, deformation as a result of sliding contact of the continuous strip with the cooling surface during the transition can be prevented.

In a further embodiment the second guiding element of the set is aligned in the circumferential direction with the first guiding element of a consecutive one of the sets. Once the continuous strip is in the second winding direction, the continuous strip can already be effectively aligned with the first guiding element, thus requiring no substantial axial shifting of the continuous strip while said continuous strip is supported on the cooling drum.

In a further embodiment the first guiding element and the second guiding element of the set are arranged for deflecting the continuous strip about a first deflection axis and a second deflection axis, respectively, wherein the first deflection axis is tilted at an oblique first angle to the rotation axis and wherein the second deflection axis is tilted at an oblique second angle to the rotation axis, opposite to the first angle. By tilting the deflection axes as specified, the continuous strip can be twisted about its longitudinal axis. The direction of the twist positions the continuous strip optimally for deflection from the first winding direction into the first transition direction, so that the continuous strip may be merely deflected, i.e. a pure deflection without any substantial axial shifting or shear deformation.

Additionally, or alternatively, the first deflection axis is perpendicular to the first winding direction and the first transition direction and/or the second deflection axis is perpendicular to the second winding direction and the second transition direction. Hence the continuous strip may be merely deflected in a direction perpendicular to the respective first winding direction, the second winding direction, the first transition direction and the second transition direction. The result can be a pure deflection without any substantial axial shifting or shear deformation.

In a preferred embodiment thereof the first guiding element and the second guiding element of the set are a first guiding roller and a second guiding roller, respectively, wherein the first deflection axis and the second deflection axis correspond to the axes of the first guiding roller and the second guiding roller, respectively. The guiding rollers can effectively guide and deflect the continuous strip about the deflection axes while conveying the continuous strip with minimal friction. Alternatively, stationary and/or non-rotatable guiding elements having a suitable sliding surface may be used.

In a further embodiment the first guiding elements are arranged side-by-side in the axial direction. Hence, the first guiding elements can be arranged in a simple array, i.e. on a common support relative to the cooling drum.

In another embodiment the second guiding elements are arranged side-by-side in the axial direction. Hence, the second guiding elements can be arranged in a simple array, i.e. on a common support relative to the cooling drum.

In a further embodiment the cooling apparatus comprises a base for rotatably supporting the cooling drum about the rotation axis, wherein the guiding device is supported relative to said base in a stationary angular position about the rotation axis. The continuous strip can thus be transition from after each winding in substantially the same angular position, thereby increasing the consistency of said transitions across the continuous strip, regardless of the progress of the curing.

In a preferred embodiment thereof, the angular position is at a stationary angle within a range of zero to sixty degrees with respect to the horizontal plane. Within said range, the guiding device can be easily reached by an operator. In contrast, the prior art steering rollers are arranged at the top of the cooling drum.

In a further embodiment the guiding device further comprises one or more first alignment elements for aligning the continuous strip at one or more of the first guiding elements along an entry line. By aligning the continuous strip, the continuous strip can be positioned accurately prior to the transition.

In a preferred embodiment thereof the one or more first aligning elements are one or more first alignment rollers, wherein each of the one or more first alignment rollers is arranged alongside one of the first guiding elements for abutting the continuous strip in the axial direction at the entry line. The rollers can effectively align the continuous strip while simultaneously conveying the continuous strip with minimal friction.

In a further embodiment thereof, the continuous strip has an inside facing towards the cooling drum, wherein said one or more first alignment rollers are arranged for obliquely abutting the inside of the continuous strip at the entry line. By obliquely abutting the inside of the continuous strip, unintentional deformations at the side (the base or the tip) of the strip can be prevented.

In a further embodiment the guiding device further comprises one or more second alignment elements for aligning the continuous strip at one or more of the second guiding elements along an exit line. The second alignment elements can effectively align the continuous strip for more accurate placement of said strip back onto the cooling drum.

In a preferred embodiment thereof the one or more second aligning elements are one or more first alignment rollers, wherein each of the one or more second alignment rollers is arranged alongside one of the second guiding elements for abutting the continuous strip in the axial direction at the exit line. The rollers can effectively align the continuous strip while simultaneously conveying the continuous strip with minimal friction.

In a further preferred embodiment thereof, the continuous strip has an inside facing towards the cooling drum, wherein said one or more second alignment rollers are arranged for obliquely abutting the inside of the continuous strip at the exit line. By obliquely abutting the inside of the continuous strip, unintentional deformations at the side (the base or the tip) of the strip can be prevented.

In an alternative embodiment the first guiding element and the second guiding element of the set define a transition path for the continuous strip, wherein the guiding device further comprises one or more alignment elements at an intermediate position along the transition path between the first guiding element and the second guiding element of each set for steering the continuous strip along the respective transition path. The one or more alignment elements can effectively correct deviations of the continuous strip from the transition path.

In a preferred embodiment thereof the one or more alignment elements comprises a first alignment roller and a second alignment roller which are oppositely inclined. The rollers can effectively align the continuous strip while simultaneously conveying the continuous strip with minimal friction. The opposite inclination means that the rollers can abut the continuous strips from opposite or different sides.

In a further alternative embodiment the plurality of windings comprises an infeed winding where the continuous strip is first applied to the cooling drum, wherein the cooling apparatus comprises an infeed pulling member for feeding the continuous strip into the infeed winding at an infeed speed, wherein the cooling apparatus further comprises a control unit that is operationally connected to the cooling drum to control the rotational speed of said cooling drum, wherein the control unit is operationally connected to the infeed pulling member and configured to control the infeed pulling member such that the infeed speed is lower than the rotational speed of the cooling drum. The continuous strip, which is still warm and flexible during the infeed winding, can be slightly pulled back to reduce or prevent sagging or slacking. In particular, the slight pull back on the continuous strip can ensure that the infeed winding is tightly wound around the cooling drum, thereby improving the effectiveness of said cooling drum.

It is noted that the infeed pulling member can be applied with a cooling drum both in combination and independently of the previously discussed guiding device.

In a preferred embodiment thereof the plurality of windings comprises an outfeed winding where the continuous strip ultimately leaves the cooling drum, wherein the cooling apparatus further comprises an outfeed pulling member for feeding the continuous strip out of the outfeed winding away from the cooling drum, wherein the control unit is operationally connected to the outfeed pulling member and configured to control the outfeed pulling member such that it pulls on the continuous strip at an outfeed rate that is higher than the rotational speed of the cooling drum. At the outfeed winding, the continuous strip may already be partially cooled and relatively inflexible. By pulling the continuous strip forward out of outfeed winding, it can be prevented that the continuous strip leaves the outfeed winding unintentionally.

It is noted that the outfeed pulling member can be applied with a cooling drum both in combination and independently of the previously discussed guiding device.

According to a second aspect, the invention provides a production line for producing a continuous strip, wherein the production line comprises an extruder for extruding the continuous strip at a variable extrusion speed, a cooling apparatus similar to the cooling apparatus according to any one of the preceding embodiments for cooling the continuous strip and a buffer member between the extruder and the cooling apparatus to absorb variations in the extrusion speed, wherein the plurality of windings comprises an infeed winding where the continuous strip is first applied to the cooling drum, wherein the cooling apparatus comprises an infeed pulling member that is located between the buffer member and the cooling drum for feeding the continuous strip into the infeed winding at an infeed speed, wherein the production line further comprises a control unit that is operationally connected to the cooling drum to control the rotational speed of said cooling drum, wherein the control unit is operationally connected to the infeed pulling member and configured to control the infeed pulling member such that the infeed speed is lower than the rotational speed of the cooling drum.

The production line comprises the cooling apparatus according to any one of the preceding embodiments and thus has the same technical advantages Said technical advantages will not be repeated hereafter.

In a preferred embodiment of the production line the plurality of windings comprises an outfeed winding where the continuous strip ultimately leaves the cooling drum, wherein the cooling apparatus further comprises an outfeed pulling member for feeding the continuous strip out of the outfeed winding away from the cooling drum, wherein the control unit is operationally connected to the outfeed pulling member and configured to control the outfeed pulling member such that it pulls on the continuous strip at an outfeed rate that is higher than the rotational speed of the cooling drum.

According to a third aspect, the invention provides a method for cooling a continuous strip using the cooling apparatus according to any one of the previously discussed embodiments, wherein the method comprises the steps of: receiving the continuous strip from the first winding at the first guiding element of the set in the first winding direction; directing the continuous strip in the first transition direction; receiving the continuous strip at the second guiding element of the set in the second transition direction; and directing the continuous strip into the consecutive winding in the second winding direction.

In a preferred embodiment the continuous strip is directed in the first transition direction towards the second guiding element of the set and received at the second guiding element from the first guiding element of the set in the second transition direction, wherein the second transition direction is the first transition direction.

Alternatively, the guiding device comprises one or more third guiding elements between the first guiding element and the second guiding element of each set, wherein the method further comprises the steps of receiving the continuous strip in the first transition direction at one or more third guiding elements from the first guiding element and directing the continuous strip towards the second guiding element in the second transition direction.

In a further embodiment thereof the continuous strip has a longitudinal direction, wherein the method further comprises the steps of:
twisting the continuous strip about the longitudinal direction prior to directing the continuous strip from the first winding direction into the first transition direction; and
twisting the continuous strip about the longitudinal direction prior to directing the continuous strip from the second transition direction into the second winding direction.

The method relates to the practical implementation of the cooling apparatus. Therefore, the method and its embodiments have the same technical advantages as the cooling apparatus and its corresponding embodiments. Said technical advantages will not be repeated hereafter.

In another embodiment the method further comprises the steps of aligning the continuous strip at one or more of the first guiding elements along an entry line.

In a further embodiment the method further comprises the steps of aligning the continuous strip at one or more of the second guiding elements along an exit line.

In a further embodiment the plurality of windings comprises an infeed winding where the continuous strip is first applied to the cooling drum, wherein the method further comprises the step of:
winding the infeed winding over at least a quarter up to at least three quarters of the circumference of the cooling surface in the circumferential direction prior to receiving the continuous strip at the first of the first guiding elements. By increasing the length of the infeed winding, the effectiveness of the cooling drum can be improved.

In a further embodiment the plurality of windings comprises an outfeed winding where the continuous strip ultimately leaves the cooling drum, wherein the method further comprises the step of:
winding the outfeed winding over at least a quarter up to at least three quarters of the circumference of the cooling surface in the circumferential direction after the continuous strip has left the last of the second guiding elements. By increasing the length of the outfeed winding, the effectiveness of the cooling drum can be improved.

In a further embodiment of the method the plurality of windings comprises an infeed winding where the continuous strip is first applied to the cooling drum, wherein the method comprises the step of feeding the continuous strip into the infeed winding at an infeed speed that is lower than the rotational speed of the cooling drum.

In a further embodiment thereof the plurality of windings comprises an outfeed winding where the continuous strip ultimately leaves the cooling drum, wherein the method further comprises the step of pulling on the continuous strip that leaves the outfeed winding at an outfeed speed that is higher than the rotational speed of the cooling drum.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which:

FIG. 7 shows a top view of the detail of the guiding device according to FIG. 4;

DETAILED DESCRIPTION OF THE INVENTION

Figure 1:
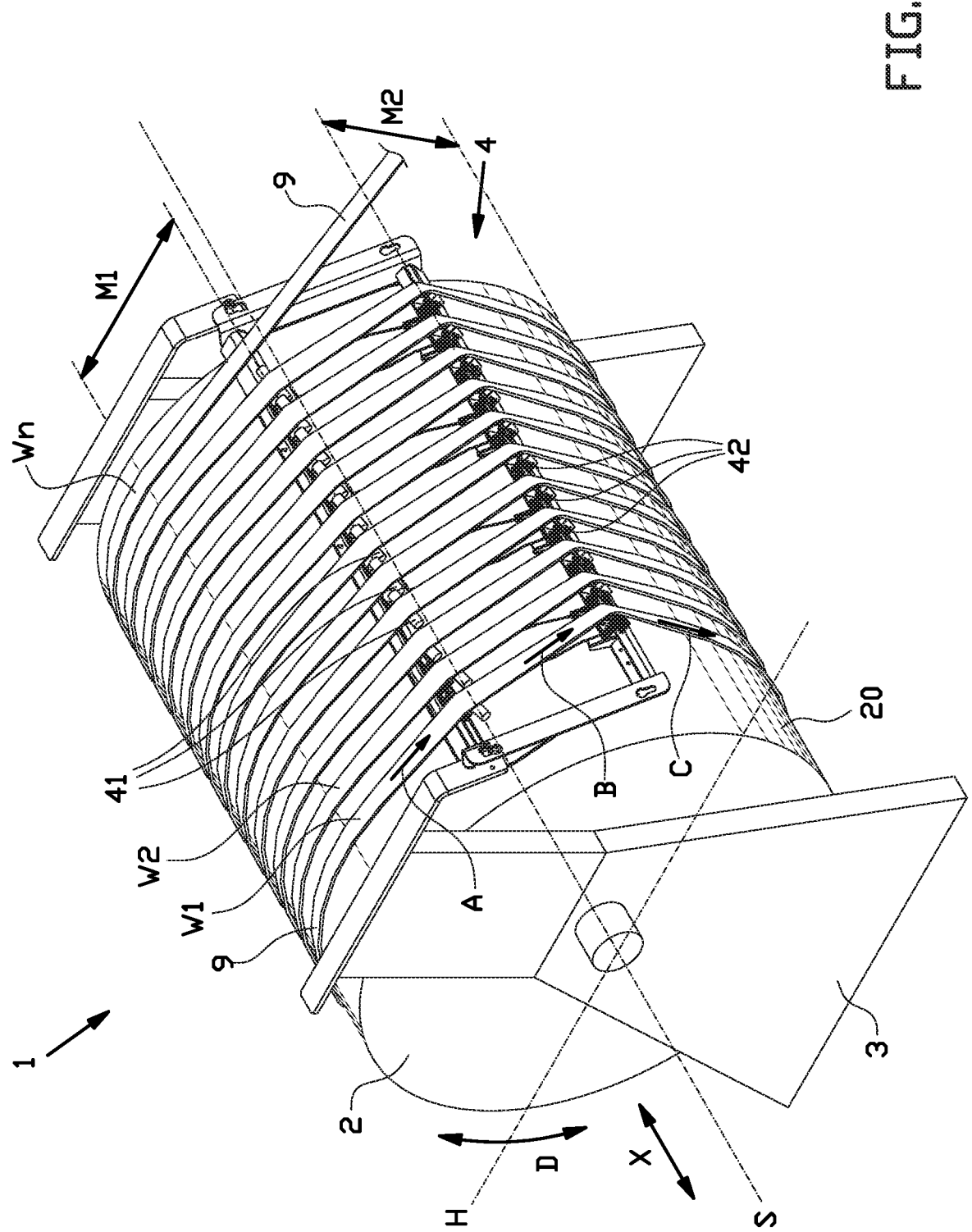
FIG. 1 shows an isometric view of a cooling apparatus with a cooling drum and a guiding device according to a first embodiment of the invention for guiding a continuous strip in a plurality of windings around the cooling drum.
Figure 2:
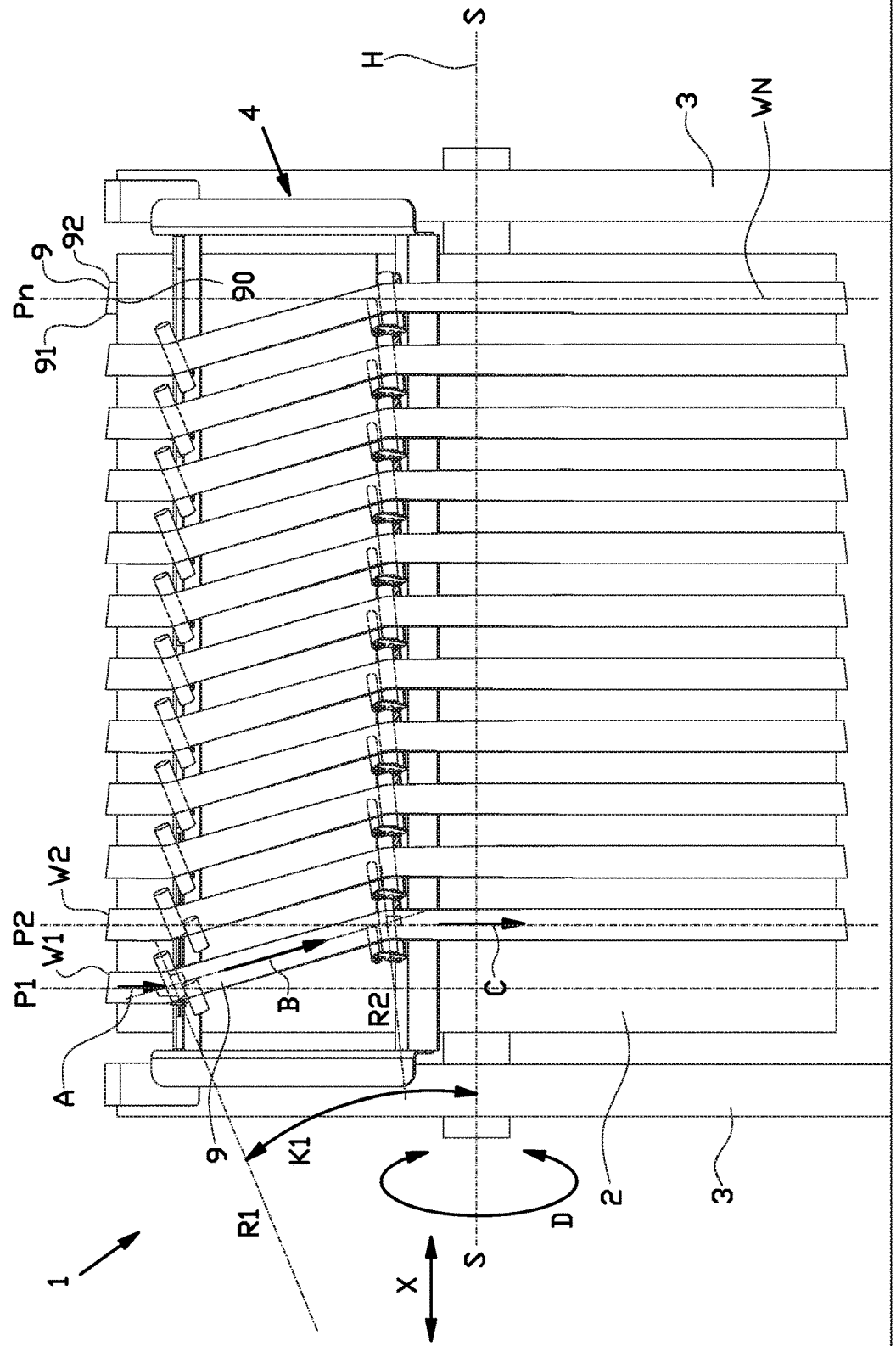
FIG. 2 shows a front view of the cooling apparatus according to FIG. 1.
Figure 3:
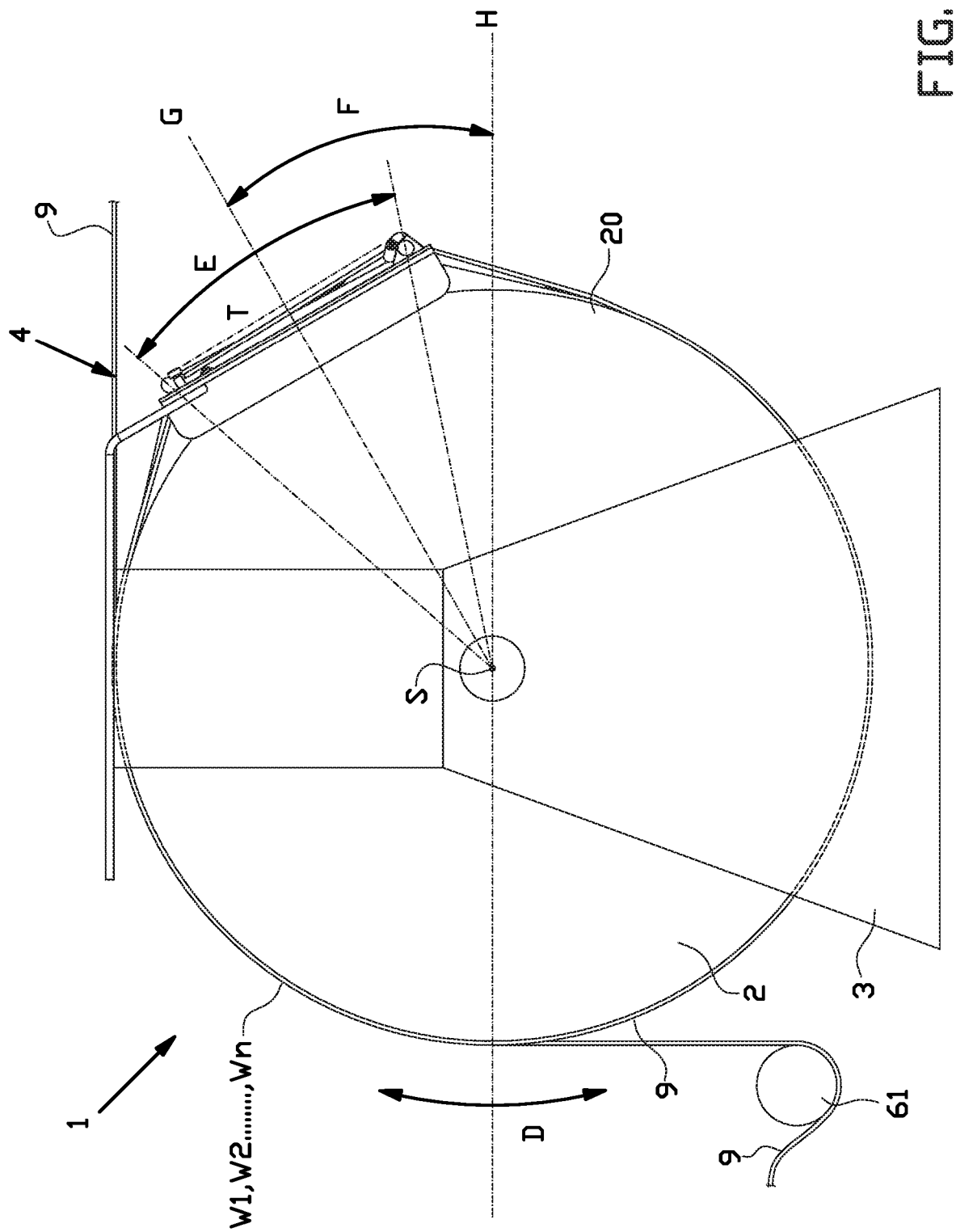
FIG. 3 shows a side view of the cooling apparatus according to FIG. 1.
Figure 4:
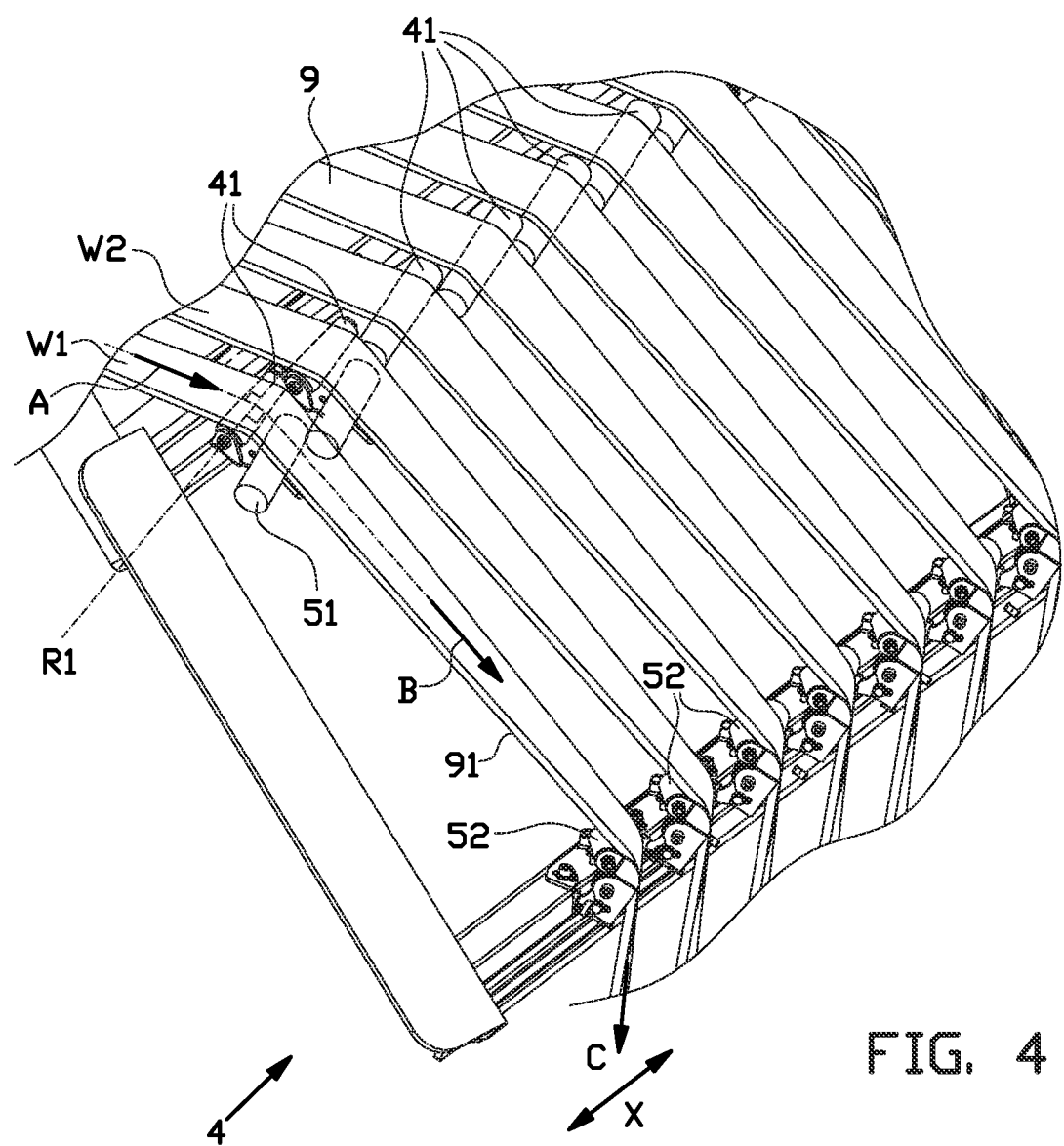
FIG. 4 shows an isometric view of a detail of the guiding device according to FIG. 1.
Figure 5:
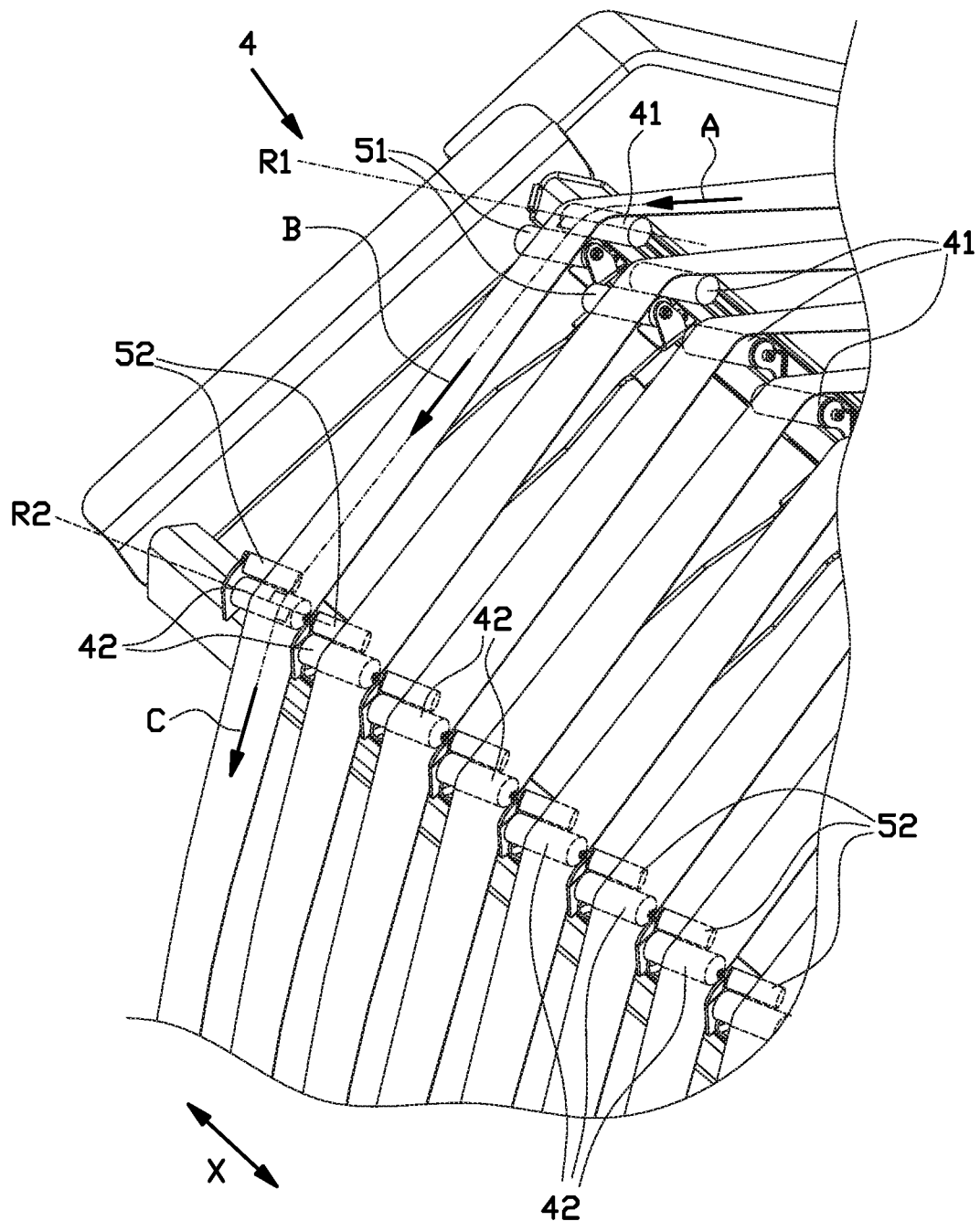
FIG. 5 an isometric view from an opposite side of the detail of the guiding device according to FIG. 4.

FIGS. 1, 2 and 3 show a cooling apparatus 1 for cooling a continuous strip 9 according to a first exemplary embodiment of the invention. The continuous strip 9 extends in or has a longitudinal direction. In this exemplary embodiment, said continuous strip 9 is a freshly extruded apex or bead filler for use in tire building. Said apex or bead filler has a triangular cross section, best seen in FIG. 2, having an inside surface 90, a base 91 and a tip 92.

The cooling apparatus 1 comprises a cooling drum 2 and a base 3 for supporting said cooling drum 2 relative to a ground surface, e.g. a factory floor. The cooling drum 2 has a cylindrical cooling surface 20 extending in a circumferential direction D about a rotation axis S concentric to the cooling surface 20. The rotation axis S extends in or defines an axial direction X. The cooling drum 2 is rotatably supported on or relative to said base 3 so as to be rotatable about the rotation axis S. The cooling drum 2 preferably comprises one or more cooling elements or a cooling medium (not shown) that cools the cylindrical cooling surface 20 to accelerate the cooling of the continuous strip 9 in a manner known per se.

The cooling apparatus 1 further comprises a guiding device 4 for guiding the continuous strip 9 in a plurality of windings W1, W2, . . . , Wn around the cooling surface 20.

As shown in FIG. 2, each winding W1, W2, . . . , Wn extends in an individual winding plane P1, P2, . . . , Pn. Hence, the windings W1, W2, . . . , Wn are not helical, but can be considered as 'straight' windings. In this example, said winding planes P1, P2, . . . , Pn are mutually parallel yet spaced apart. More preferably, said winding planes P1, P2, . . . , Pn extend perpendicular or normal to the rotation axis S. For clarity reasons, not all windings and planes have been given an individual reference sign.

The guiding device 4 comprises first redirection or guiding elements 41 and second redirection or guiding elements 42. The guiding device 4 is provided with a guide frame 40 for supporting the guiding elements 41, 42 in an angular position G, as shown in FIG. 3, relative to the cooling drum 2. Preferably, said angular position G is at a stationary angle F with respect to the rotation axis S. Hence, the cooling drum 2 is rotatable about the rotation axis S relative to said guiding device 4. The angular position G in this example is at approximately thirty degrees with respect to the horizontal plane H, which is a position that is easily reachable for an operator. The first guiding elements 41 are preferably arranged side-by-side in the axial direction X, e.g. in a linear array. Similarly, the second guiding elements 42 are arranged side-by-side in the axial direction X, e.g. in a linear array parallel to the linear array of the first guiding elements 41.

Each one of the first guiding elements 41 forms a set with one of the second guiding elements 42 to guide the continuous strip 9 in a transition from a first winding W1 to a consecutive winding W2 of the plurality of windings W1, W2, . . . , Wn. Note that in the context of the claims, the 'first winding' is not necessarily the very first winding, but the first winding of any pair of consecutive windings. The first winding where the continuous strip 9 is first applied to the cooling drum 2 is hereafter referred to as the infeed winding W1. The last winding where the continuous strip 9 exits or leaves the cooling drum 2 is hereafter referred to as the outfeed winding Wn.

Figures 8A, 8B:
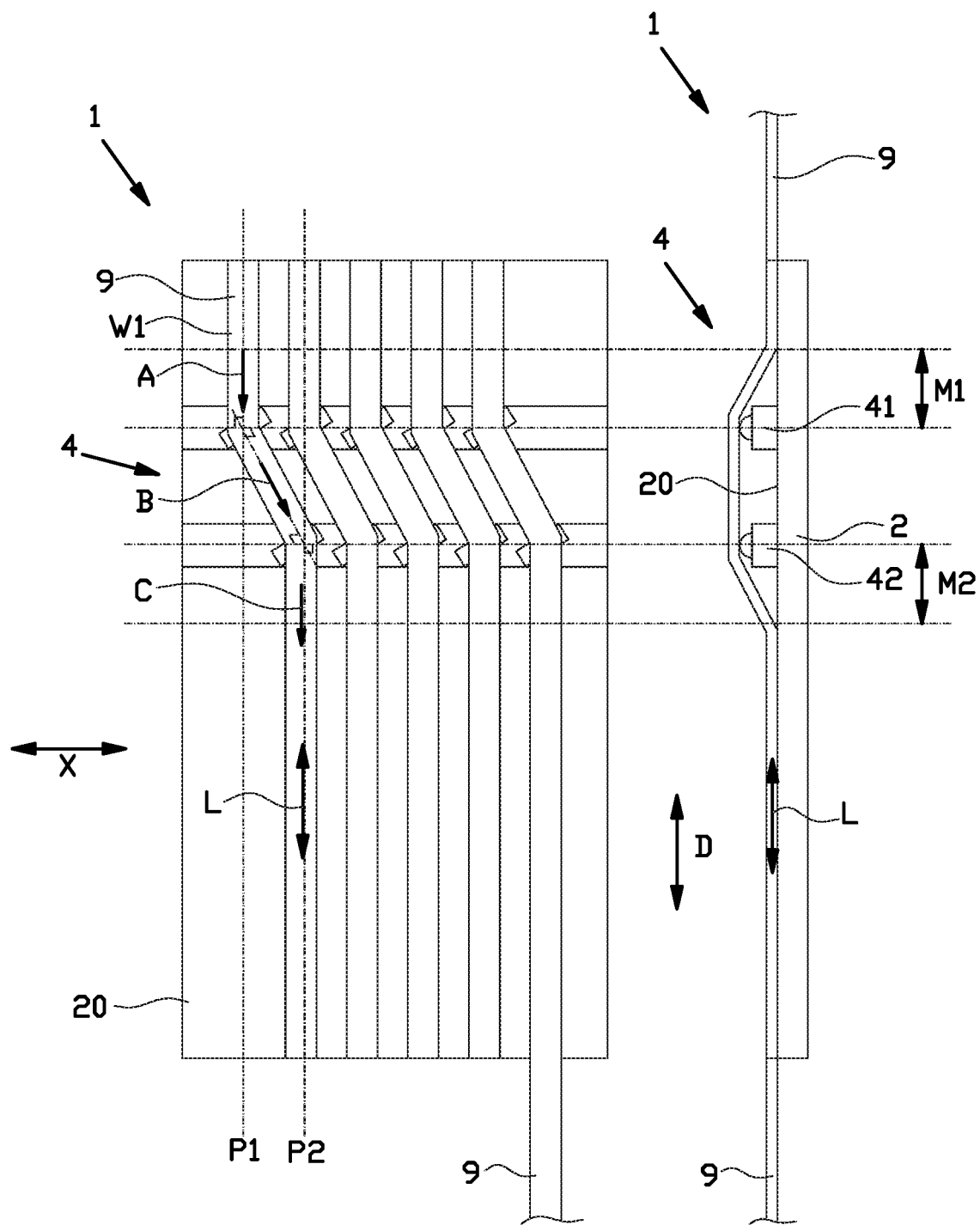
FIGS. 8A and 8B show a front view and a side view, respectively, of a two-dimensional rollout of the cylindrical cooling surface of the cooling drum.

As schematically shown in FIG. 8A, the first guiding element 41 of the set is arranged for receiving the continuous strip 9 from the first winding W1 in a first winding direction A and for directing the continuous strip 9 in a transition direction B towards the second guiding element 42 of the set. The second guiding element 42 of the set is arranged for receiving the continuous strip 9 in the transition direction B from the first guiding element 41 of the set and for directing the continuous strip 9 into the consecutive winding W2 in a second winding direction C. The transition direction B is different from the first winding direction A and the second winding direction C. In particular, the transition direction B extends obliquely with respect to both the first winding direction A and the second winding direction C. In this particular example, the first winding direction A and the second winding direction C extend in the first winding plane P1 and the second winding plane P2, respectively. Consequently, as both winding planes P1, P2 in this example are parallel, the first winding direction A and the second winding direction C are also parallel.

As best seen in FIG. 3, the first winding direction A and the second winding direction C are tangent to the cooling surface 20, meaning that they extend to or from the guiding elements 41, 42 along a line that is tangent to the cooling surface 20. In this particular example, as shown in FIG. 1 and schematically in FIG. 8B, the first guiding elements 41 are at a first distance M1 from the cooling surface 20 in the first winding direction A, wherein the first distance M1 is the same or substantially the same for all first guiding elements 41. Similarly, the second guiding elements 42 are at a second distance M2 from the cooling surface 20 in the second winding direction C, wherein the second distance M2 is the same or substantially the same for all second guiding elements 42.

As shown in FIG. 8A, the second guiding elements 42 of each set are offset with respect to the respective first guiding element 41 of the same set in the axial direction X. In addition, the second guiding elements 42 of each set are offset with respect to the respective first guiding element 41 of the same set in the circumferential direction D. The sum of the offsets in both directions defines the obliqueness of the transition direction B. As shown in FIG. 3, the first guiding element 41 and the second guiding element 42 of each set are spaced apart in the circumferential direction D over a spacing angle E in the range of twenty to sixty degrees, and preferably in the range of thirty to forty degrees. At such spacing angle E, the continuous strip 9 can be made to transition gradually, while the continuous strip 9 is still in contact with the cooling surface 20 during a sufficient part of the remaining circumference of the cooling drum 2. In this exemplary embodiment, as shown in FIG. 2, the second guiding element 42 of each set is aligned in the circumferential direction D with the first guiding element 41 of a consecutive one of the sets, i.e. the second guiding element 42 of one set lies in the same winding plane P1, P2, Pn as the first guiding element 42 of a consecutive one of the sets.

As further shown in FIG. 3, the first guiding element 41 and the second guiding element 42 of each set define a linear transition path T for the continuous strip 9 to travel between the respective guiding elements 41, 42. The first guiding element 41 and the second guiding element 42 of each set are preferably positioned relative to the cooling surface 20 so that the transition path T is completely spaced apart from the cooling surface 20. Hence, the transition of the continuous strip 9 can take place independently from the cooling surface 20 of the cooling drum 2.

Figure 6:
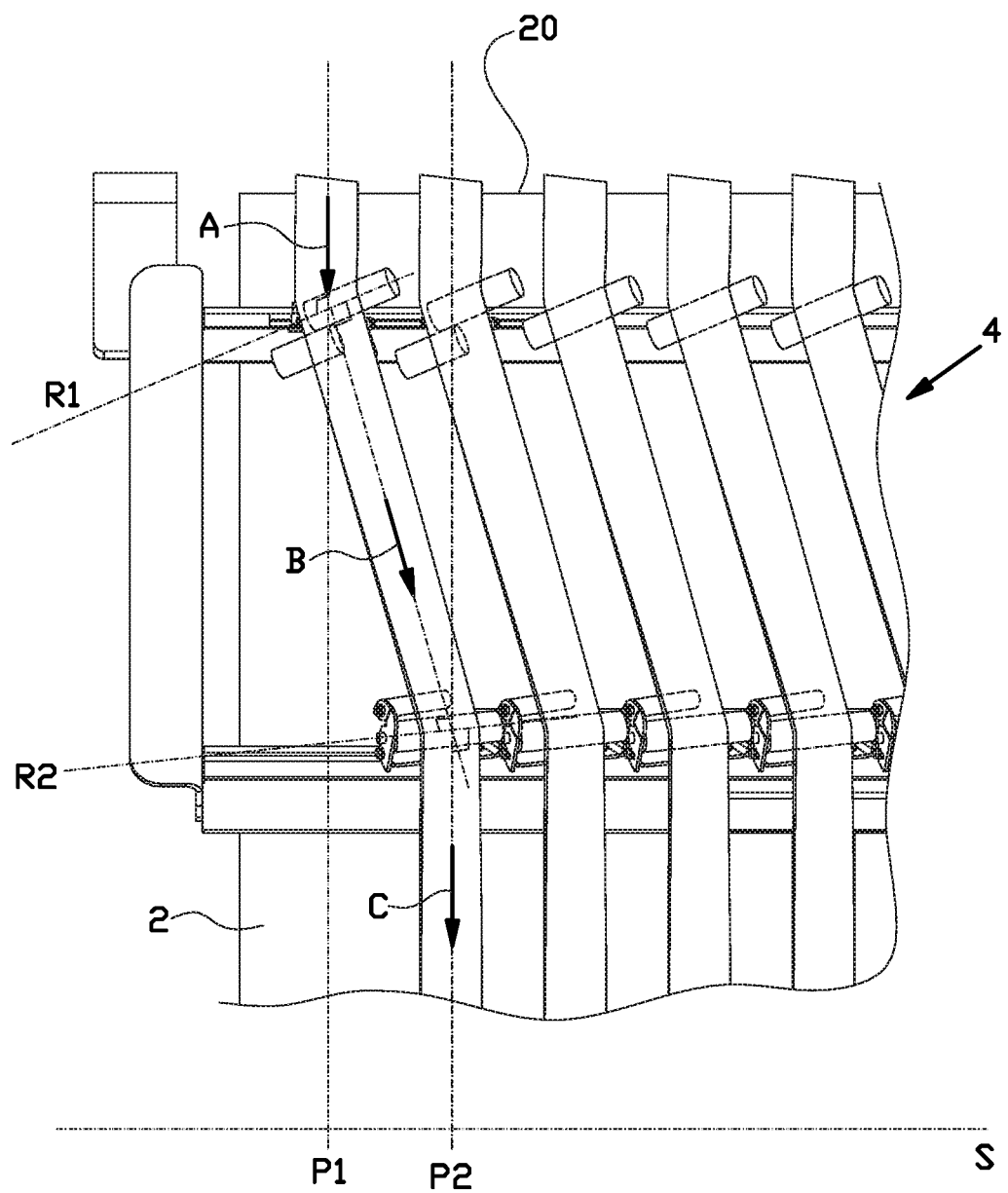
FIG. 6 shows a front view of the detail of the guiding device according to FIG. 4.

As shown in more detail in FIGS. 4, 5, 6 and 7, the first guiding elements 41 in this example are first guiding rollers 41. As shown in FIG. 6, each first guiding roller 41 has an axis that defines a first deflection axis R1 for folding or deflecting the continuous strip 9 from the first winding direction A into the transition direction B. The first deflection axis R1 is tilted at an oblique first angle K1 to the rotation axis S. Additionally or alternatively, said first deflection axis R1 extends in a direction perpendicular to both the first winding direction A and the transition direction B. Said specific orientation of the first deflection axis R1 causes the first guiding roller 41 to twist the continuous strip 9 in the part of the continuous strip 9 between the cooling surface 20 and the first guiding roller 41. In particular, once the continuous strip 9 arrives at the first guiding roller 41, it is preferably in an orientation that is optimal for the subsequent deflection of the continuous strip 9 about the first guiding roller 41 from the first winding direction A into the transition direction B.

Similarly, the second guiding elements 42 in this example are second guiding rollers 42. As shown in FIG. 7, each second guiding roller 42 has an axis that defines a second deflection axis R2 for folding or deflecting the continuous strip 9 from the transition direction B into the second winding direction C. The second deflection axis R2 is tilted at an oblique second angle K2 to the rotation axis S, opposite to the first angle K1. Additionally or alternatively, said second deflection axis R2 extends in a direction perpendicular to both the second winding direction C and the transition direction B. Said specific orientation of the second deflection axis R2 causes the first guiding roller 42 to twist the continuous strip 9 back with respect to the earlier twist at the first guiding roller 41 in the part of the continuous strip 9 between the cooling surface 20 and the second guiding roller 42. In particular, once the continuous strip 9 arrives at the second guiding roller 42, it is preferably in an orientation that is optimal for the subsequent deflection of the continuous strip 9 about the second guiding roller 42 from the transition direction B into the second winding direction C.

The guiding rollers 41, 42, due to their tilted orientation, are able to twist and subsequently merely deflect the continuous strip 9 around a part of their circumference. Consequently, the continuous strip 9 is subjected to a pure deflection without any substantial axial shifting or shear deformation. More in particular, its neutral line or theoretical center line (not shown) is deflected around the guiding rollers 41, 42 without any abrupt shifting in the axial direction X.

As shown in FIG. 7, the guiding device 4 further comprises a plurality of first alignment elements 51 for aligning the continuous strip 9 at one or more of the first guiding elements 41 along an entry line E1. In this exemplary embodiment, only two first alignment elements 51 are provided at the first two windings W1, W2 to ensure proper feeding of the continuous strip 9 into the guiding device 4. It has been found that further first alignment elements 51 can be dispensed with once the continuous strip 9 has been successfully fed into the guiding device 4 over at least two windings W1, W2.

Optionally, the guiding device 4 may comprise one or more second alignment elements 52 for aligning the continuous strip 9 at one or more of the second guiding elements 42 along an exit line E2. In this exemplary embodiment, second alignment elements 52 have been provided at all of the second guiding elements 42 to ensure that the windings W1, W2, . . . , Wn are aligned at least once during each winding W1, W2, . . . , Wn. Alternatively, the second alignment elements 52 may be provided at a limited number of second guiding elements 42.

Preferably, the alignment elements 51, 52 are alignment rollers 51, 52 that can effectively align the continuous strip 9 as it passes while conveying said continuous strip 9 with minimal friction.

As best seen in FIG. 7, the alignment rollers 51, 52 are arranged at a slightly oblique angle relative to their respective guiding rollers 41, 42 so that each combination of an alignment roller 51, 52 and a guiding roller 41, 42 forms a V-like configuration to guide and align the continuous strip 9. In particular, the guiding rollers 41, 42 are arranged for abutting the inside 90 of the continuous strip 9 while the alignment rollers 51, 52 have been provided at a slight angle to the respective guiding roller 41, 42 to obliquely abut the inside of the continuous strip 9 at or along the respective entry line E1 or exit line E2.

Optionally, the angles K1, K2 may be adjustable, e.g. by adjustably mounting the rollers 41, 42 to the frame 40. As a further option, the frame 40 as a whole may be adjustable in position, e.g. in the circumferential direction to adjust the angular position G or in the axial direction X.

Figure 9A:
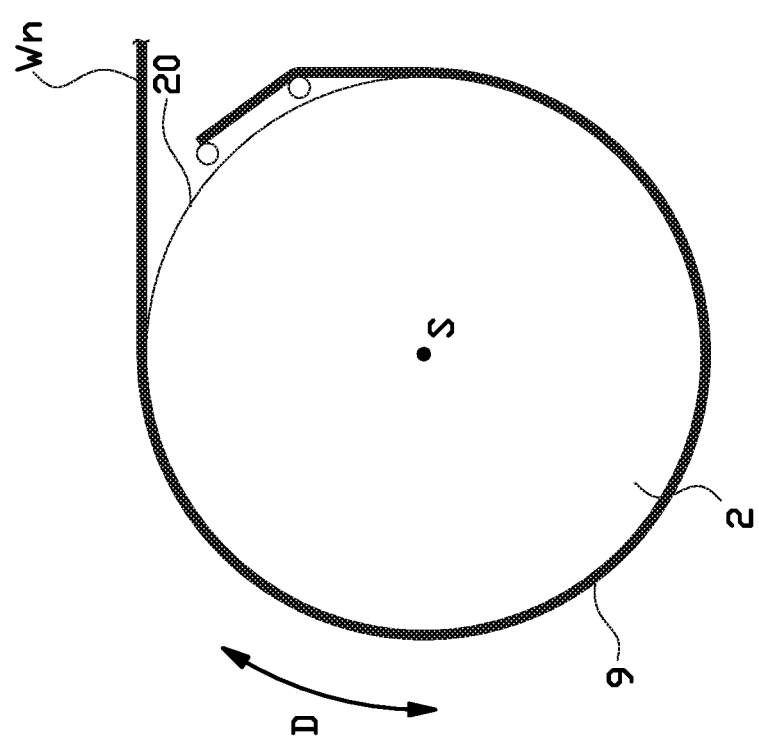
FIGS. 9A and 9B show a first winding and a last winding, respectively, of a plurality of windings of the continuous strip around the cooling drum.
Figure 9B:
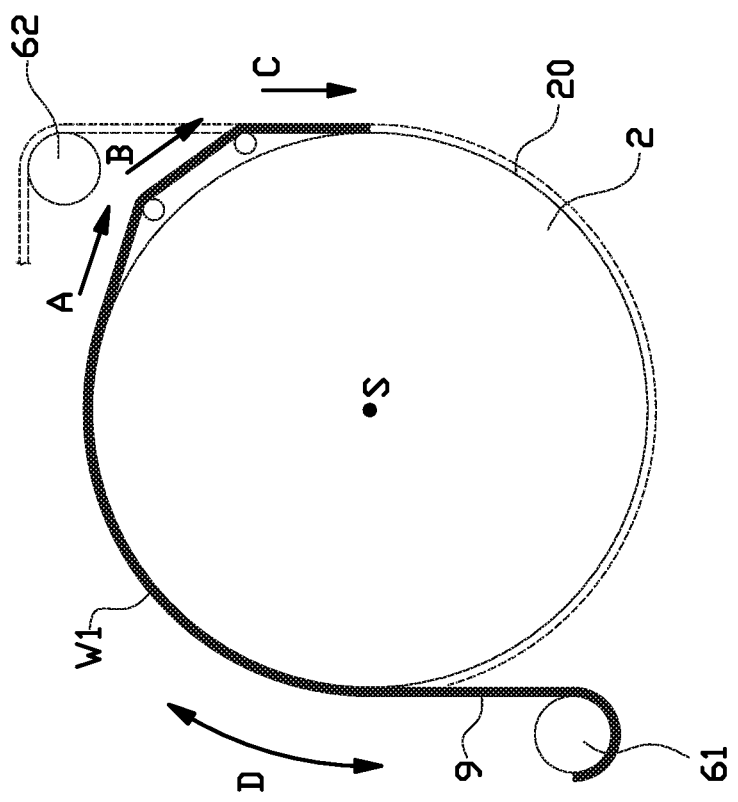
Figure 10:
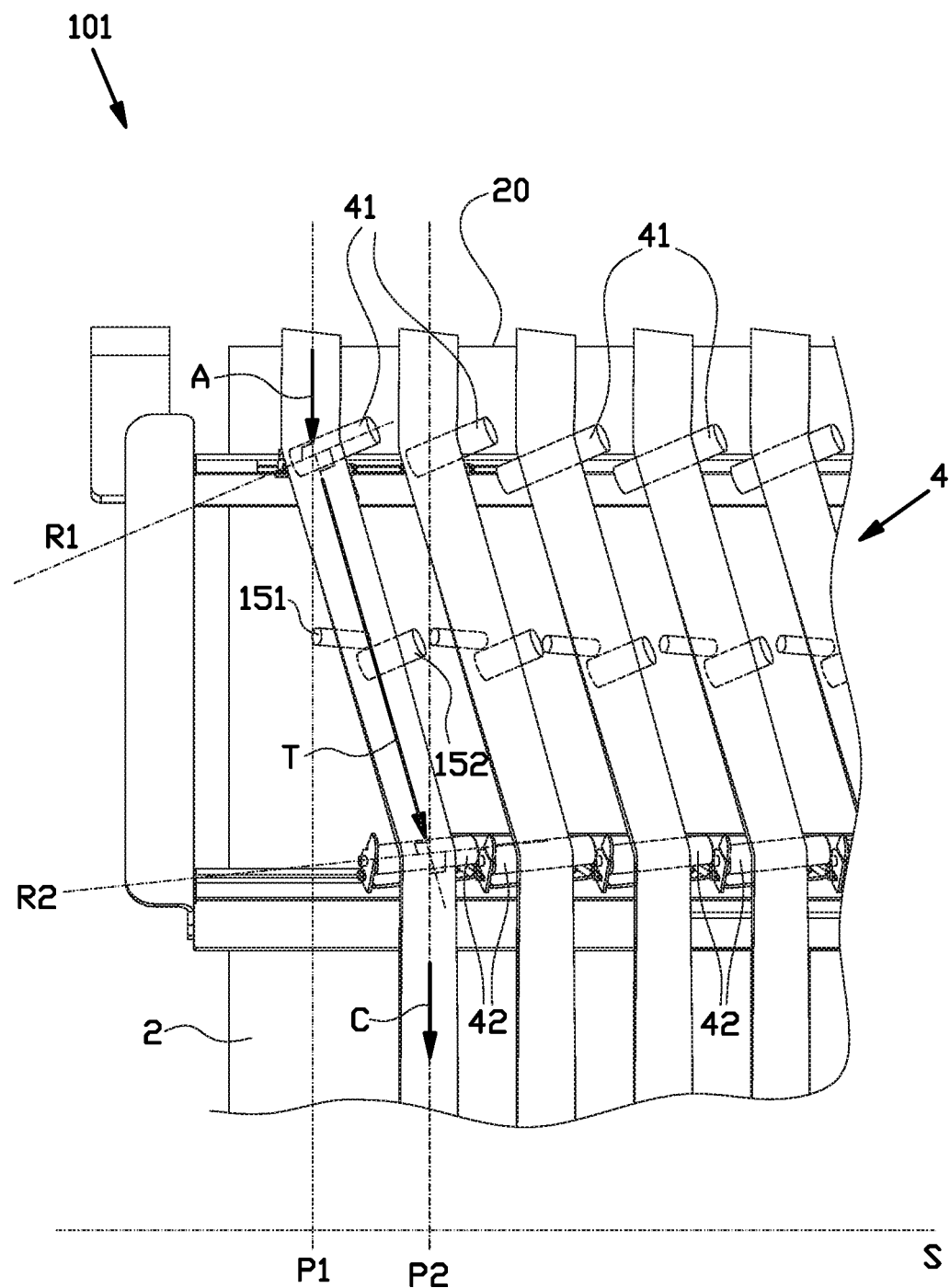
FIG. 10 shows a detail of an alternative cooling apparatus according to a second embodiment of the invention.

FIG. 10 shows a detail of an alternative cooling apparatus 101. The view of FIG. 10 substantially corresponds to the view of FIG. 6. The alternative cooling apparatus 101 differs from the cooling apparatus 1 of FIGS. 1-9 in that it features one or more alignment elements 151, 152 at an intermediate position along the transition path T between the first guiding element 41 and the second guiding element 42 of each set for steering the continuous strip 9 along the respective transition path T. In this particular example, the one or more alignment elements 151, 152 comprises a first alignment element 151 and a second alignment element 152 which are placed in close proximity to each other at said intermediate position. The intermediate position as shown in more or less in the middle of the transition path T between the first guide element 41 and the second guide element 42. However, it will be clear that a different intermediate position, i.e. not in the middle of the transition path T, is also possible. The alignment elements 151, 152 may for example be placed at ⅓ or ¼ of the transition path T.

In this exemplary embodiment, the one or more alignment elements 151, 152 comprises a first alignment roller 151 and a second alignment roller 152. Preferably, said first alignment roller 151 and said second alignment roller 152 are oppositely inclined to abut the strip 9 from different or opposite sides.

Figure 11A:
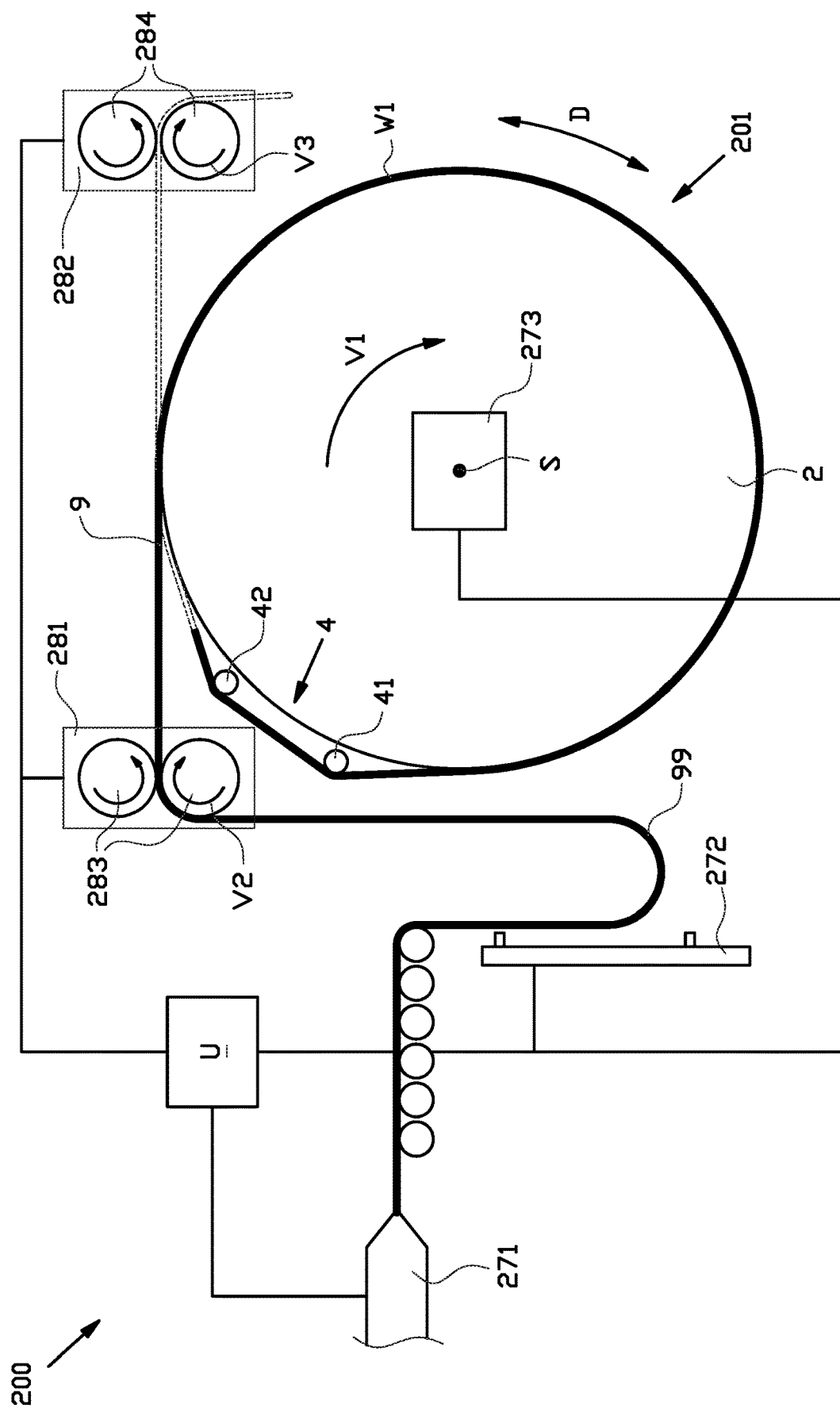
FIGS. 11A and 11B show a production line with a further alternative cooling apparatus according to a third embodiment of the invention, while feeding in or feeding out the first winding and the last winding, respectively.
Figure 11B:
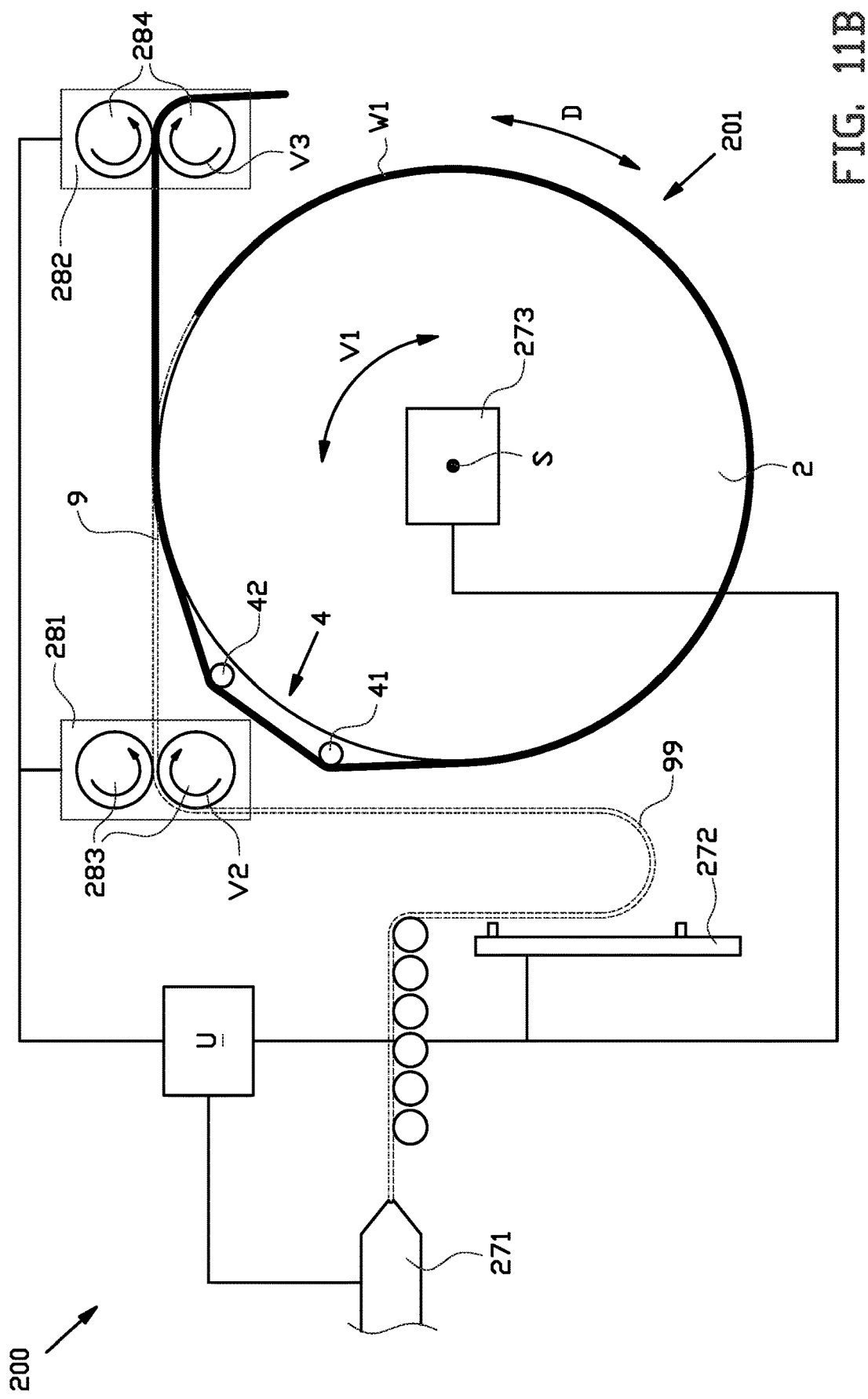

FIGS. 11A and 11B show a production line 200 for producing the continuous strip 9. The production line 200 comprises an extruder 271 for extruding the continuous strip 9 at a variable extrusion speed. The production line 200 also comprises a further alternative cooling apparatus 201 according to a third exemplary embodiment of the invention. The production line 200 additional has a buffer member 272 between the extruder 271 and the further alternative cooling apparatus 201 to absorb variations in the extrusion speed. The buffer member 272 may be a dancer roller or sensor unit to control the length of a free loop 99 in the continuous strip 9 in response to variations in the extrusion speed. The production line 200 also features a control unit U that is operationally and/or electronically connected to one or more of the extruder 271, the buffer member 272 and the further alternative cooling apparatus 201 in a manner that will be described hereafter.

Figure 13:
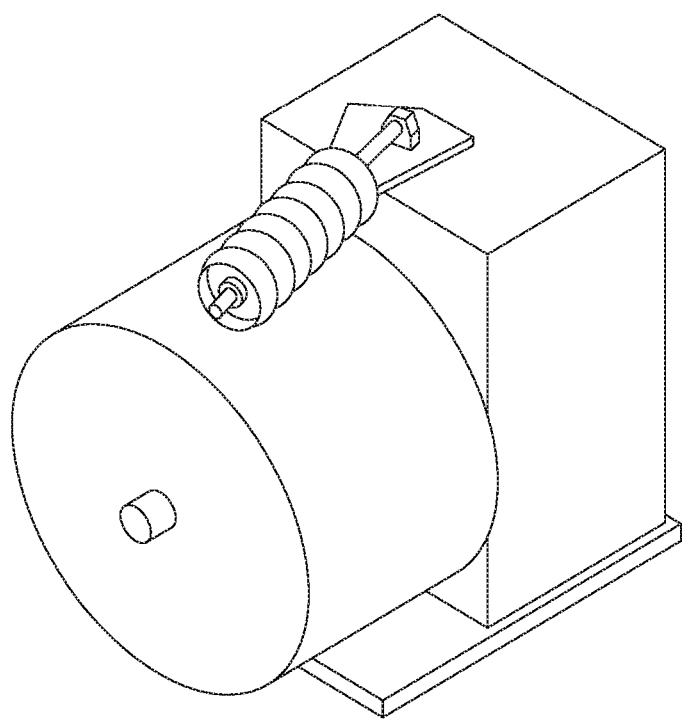
FIG. 13 shows a prior art cooling apparatus.

The further alternative cooling apparatus 201 may have substantially the same features as the previously discussed cooling apparatuses 1, 101. However, for this embodiment, the guide elements and/or the alignment elements are not essential. The differentiating features of this embodiment can for example also be applied independently of the previous embodiments, i.e. in combination with the prior art cooling apparatus of FIG. 13. Basically, the further alternative cooling apparatus 201 only requires a cooling drum 2 that is driven or drivable at a rotational speed V1. The control unit U is operationally and/or electronically connected to a drum drive or motor 273 of the cooling drum 2 to control said rotational speed V1.

The further alternative cooling apparatus 201 differs from the previously discussed cooling apparatuses 1, 101 and the prior art cooling apparatus in that it has a infeed pulling member 281 that is located between the buffer member 272 and the cooling drum 2 for feeding the continuous strip 9 into the infeed winding W1 at an infeed speed V2. The control unit U is operationally and/or electronically connected to the infeed pulling member 281 and configured to control the infeed pulling member 281 such that the infeed speed V2 is lower than the rotational speed V1 of the cooling drum 2. The infeed speed V2 may for example be at least five percent or at least ten percent lower than the rotation speed V1. Hence, the continuous strip 9, which is still warm and flexible during the infeed winding W1, can be slightly pulled back to reduce or prevent sagging or slacking. In particular, the slight pull on the continuous strip 9 can ensure that the infeed winding W1 is tightly wound around the cooling drum 2, thereby improving the effectiveness of said cooling drum 2.

Because of the speed difference between the infeed speed V2 and the rotational speed V1 of the cooling drum 2, the continuous strip 9 may be stretched slightly. Optionally, the infeed speed V2 can be variable controlled to control the stretching and therefore the dimension, i.e. the cross section, height and/or width, of the continuous strip 9.

Additionally, or alternative, an outfeed pulling member 282 may be provided for feeding the continuous strip 9 out of the outfeed winding Wn away from the cooling drum 2. The control unit U is operationally and/or electronically connected to the outfeed pulling member 282 and configured to control the outfeed pulling member 282 such that it pulls on the continuous strip 9 at an outfeed speed V3 that is higher than the rotational speed V2 of the cooling drum 2. The outfeed speed V3 may for example be at least five percent or at least ten percent higher than the rotation speed V1. At the outfeed winding Wn, the continuous strip 9 is already partially cooled and relatively inflexible. By pulling the continuous strip 9 forward out of outfeed winding Wn, it can be prevented that the continuous strip 9 leaves the outfeed winding Wn unintentionally.

Preferably, the infeed pulling member 281 comprises one or more pulling rollers 283, in this exemplary embodiment a set of two pulling rollers 283. At least one of the pulling rollers 283 is actively driven and controlled by the control unit U to rotate at the outfeed speed V3. Similarly, the outfeed pulling member 282 preferably comprises one or more pulling rollers 284, in this exemplary embodiment a set of two pulling rollers 284, at least one of which is actively driven and controlled by the control unit U.

The pulling rollers 283 of the infeed pulling member 281 may be relatively smooth to ensure optimal grip between the warm, tacky continuous strip 9 and the pulling roller 283. In contrast, the pulling rollers 284 of the outfeed pulling member 282 may be relatively rough to generate an appropriate amount of grip between the at least partially cooled continuous strip 9 and the pulling rollers 284 while also allowing for slip between the continuous strip 9 and the pulling rollers 284. In particular, slack in the continuous strip 9 between the cooling drum 2 and the outfeed pulling member 282 will be pulled tight by the pulling rollers 284 of the outfeed pulling member 282, but as soon as the slack is removed, the at least partially cooled continuous strip 9 can no longer match the higher outfeed speed V3 of outfeed pulling member 282 and—as a result—will slip over the surface of the pulling rollers 284.

Figure 12:
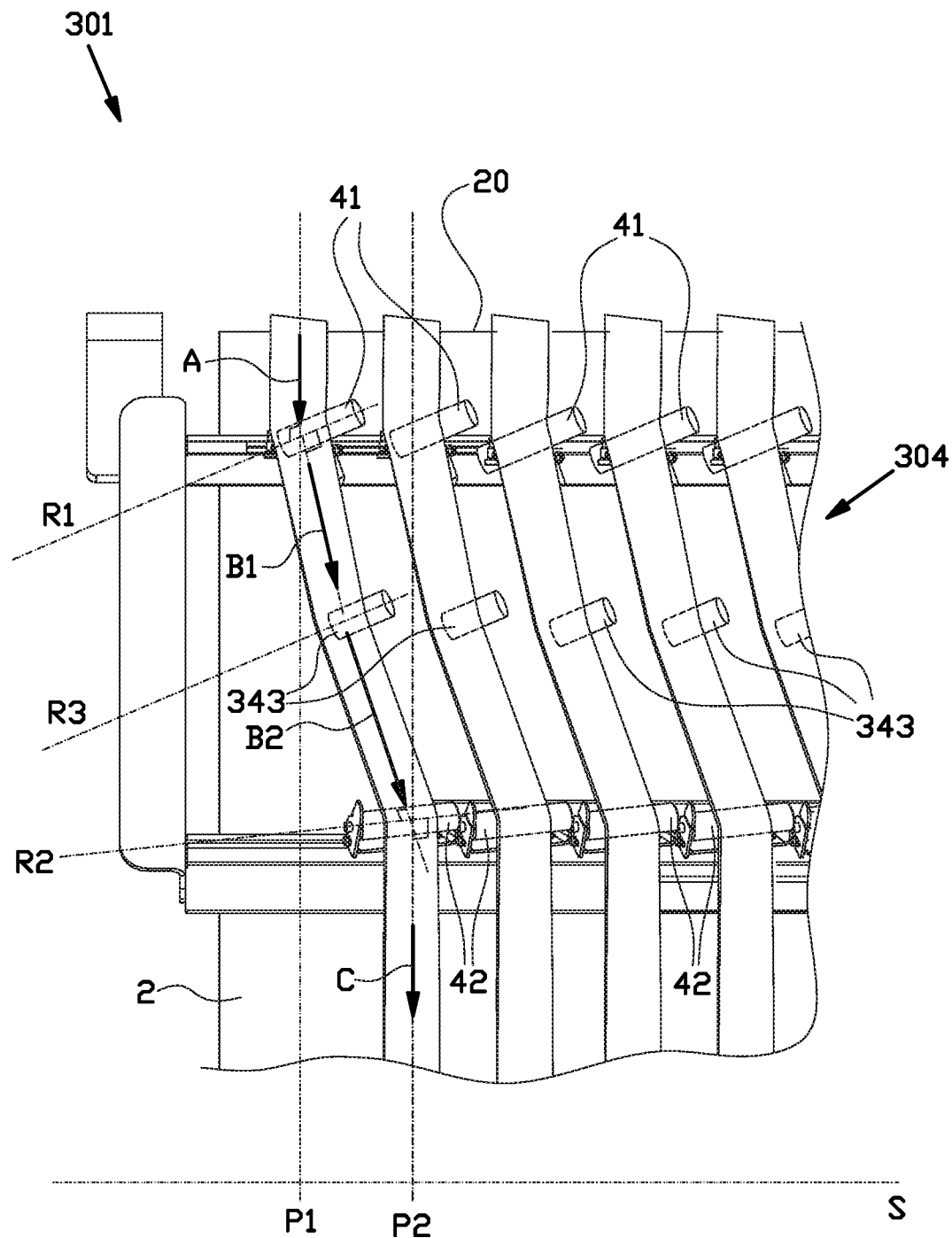
FIG. 12 shows a further alternative cooling apparatus according to a fourth embodiment of the invention.

FIG. 12 shows a further alternative cooling apparatus 301 according to a fourth embodiment of the invention that differs from the previously discussed cooling apparatuses 1, 101, 201 in that its guiding device 304 comprises a third redirection or guiding element 343 between the first guiding element 41 and the second guiding element 42 of each set. The third guiding element 304 is arranged for twisting and/or deflecting the continuous strip 9 in a similar way as the first guiding element 41 and the second guiding element 42 about a third deflection axis R3. Because of the presence of the third guiding element 304, the twist or deflection of the continuous strip 9 at the first guiding element 41 and/or the second guiding element 42 can be slightly reduced to prevent axial shifting or shear deformation. In particular, the continuous strip 9 can initially be directed from the first winding direction A into a first transition direction B1 different from said first winding direction A. The continuous strip 9 can subsequently be received at the third guiding element 343 in the first transition direction B1 and directed further into a second transition direction B2 different from the first transition direction B1 towards the second guiding element 42. Ultimately, the continuous strip 9 can be received at the second guiding element 42 in the second transition direction B2. It is noted the average of the first transition direction B1 and the second transition direction B2 still results in the same overall transition direction as in the previously discussed embodiments.

It will be apparent to one skilled in the art that the guiding device 304 may comprise a plurality of third or further guiding elements between the first guiding element 41 and the second guiding element 42 of each set to divide the transition path in even more sections, each with its own transition direction. As a group, the plurality of third or further guiding elements 343 are arranged for receiving the continuous strip 9 in the first transition direction B1 from the first guiding element 41 and for directing said continuous strip 9 towards the second guiding element 42 in the second transition direction B2 in a similar way as the single third guiding element 343.

The method for cooling the continuous strip 9 with the use of the aforementioned cooling apparatuses 1, 101, 201 will now be described with reference to FIGS. 1-11.

As shown in FIG. 3, the freshly extruded, continuous strip 9 is supplied from an extruder (not shown) to the cooling drum 3. Preferable, an infeed member 61, such as a dancer roller, is provided to guide the infeed winding W1 to the cooling surface 20 of the cooling drum 2. In this example, the continuous strip 9 is fed to the cooling drum 2 from below. As shown in FIG. 9A, this means that the infeed winding W1 extends over approximately a quarter of the circumference of the cooling surface 20 in the circumferential direction D prior to receiving of the continuous strip 9 at the first of the first guiding elements 41. Alternatively, as shown in dashed lines in FIG. 9A, the continuous strip 9 may be fed to the cooling drum 2 from an alternative infeed member 62 above the cooling drum 2, so that the infeed winding W1 extends over a considerably longer portion of the circumference of the cooling drum 2, e.g. at least three quarters. Hence, the cooling effectiveness of the cooling drum 2 can be increased.

When approaching the first guiding element 41 of one of the sets, the continuous strip 9 leaves the cooling surface 20 and extends in the first winding direction A and in the first winding plane P1 towards the first guiding element 41. Between the cooling surface 20 and the first guiding element 41, the continuous strip 9 is twisted as discussed before. Once the continuous strip 9 reaches the first guiding element 41 of one of the sets, it is received by said first guiding element 41 in the first winding direction A and subsequently directed by said first guiding element 41 in the transition direction B towards the second guiding element 42 of the same set. The continuous strip 9 subsequently travels along the transition path T as shown in FIG. 3 from the first guiding element 41 towards the second guiding element 42. Because of the difference in orientation of the two roller axes R1, R2, the continuous strip 9 is twisted slightly between the two guiding elements 41, 42 of the set in order to position the continuous strip 9 optimally for the subsequent deflection at the second guiding element 42. The continuous strip 9 is then received by the second guiding element 42 in the transition direction B and directed by said second guiding element 42 from the transition direction B into the second winding direction C and into the second winding plane P2. The continuous strip 9 is allowed to twist back into an orientation in which the inside 90 is parallel again to the rotation axis S. The continuous strip 9 contacts the cooling surface 20 again and subsequently enters the second winding W2.

The above process is repeated at the transition between each winding W1, W2, ..., Wn until the outfeed winding Wn has been reached. At one or more of the windings W1, W2, ..., Wn, the method comprises the step of aligning the continuous strip 9 along the entry line E1 and/or the exit line E2 as previously discussed.

As shown in FIG. 9B, the outfeed winding Wn preferably extends over at least a quarter up to at least three quarters of the circumference of the cooling surface 20 in the circumferential direction D after the continuous strip 9 has left the last of the second guiding elements 42. Hence, the coolest part of the cooling drum 2 can be used effectively.

At startup, the continuous strip 9 is guided manually through or along each of the guiding elements 41, 42. Once the outfeed winding Wn has been connected to a downstream station, the continuous strip 9 can be pulled through automatically. When feeding the leading end of the continuous strip 9 through each winding W1, W2, ..., Wn at the startup, tools may be used to temporarily clamp the continuous strip 9 to the cooling drum 2, e.g. through magnetic attraction.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A cooling apparatus for cooling a continuous strip,
   wherein the cooling apparatus comprises a cooling drum with a cylindrical cooling surface that extends in a circumferential direction and has a rotation axis concentric to the cooling surface and extending in an axial direction,
   wherein the cooling apparatus further comprises a guiding device for guiding the continuous strip in a plurality of windings around the cooling surface,
   wherein the guiding device comprises a plurality of first guiding rollers and a plurality of second guiding rollers,
   wherein each one of the plurality of first guiding rollers respectively forms a set with an associated one of the plurality of second guiding rollers to guide the continuous strip in a transition from a first winding to a consecutive winding of the plurality of windings,
   wherein at least one of the plurality of the first guiding rollers of each set is arranged for receiving the continuous strip from the first winding in a first winding direction and for directing the continuous strip in a first transition direction,
   wherein at least one of the plurality of the second guiding rollers of each set is arranged for receiving the continuous strip in a second transition direction and for directing the continuous strip into the consecutive winding in a second winding direction,
   wherein the at least one of the plurality of second guiding rollers of each set is offset with respect to the at least one of the plurality of first guiding rollers of the respective set in the axial direction and in the circumferential direction,
   wherein the first transition direction is different from the first winding direction and the second transition direction is different from the second winding direction.

2. The cooling apparatus according to claim 1, wherein the first guiding roller of each set is arranged for directing the continuous strip in the first transition direction towards the second guiding roller of the respective set, and
   wherein the second guiding roller of each set is arranged for receiving the continuous strip from the first guiding roller of the respective set in the second transition direction,
   wherein the second transition direction is the first transition direction.

3. The cooling apparatus according to claim 1, wherein the guiding device comprises one or more third guiding rollers between the first guiding roller and the second guiding roller of each set,
   wherein the one or more third guiding rollers are arranged for receiving the continuous strip in the first transition direction from the first guiding roller and for directing the continuous strip towards the second guiding roller in the second transition direction.

4. The cooling apparatus according to claim 1, wherein the continuous strip has a longitudinal direction,
   wherein the first guiding rollers and the second guiding rollers are arranged for twisting the continuous strip about the longitudinal direction thereof prior to directing the continuous strip from the first winding direction into the first transition direction and from the second transition direction into the second winding direction.

5. The cooling apparatus according to claim 1, wherein the first winding direction and the second winding direction are tangent to the cooling surface.

6. The cooling apparatus according to claim 5, wherein the first guiding rollers are at a first distance from the cooling surface in the first winding direction, wherein the first distance is the same for all first guiding rollers.

7. The cooling apparatus according to claim 5, wherein the second guiding rollers are at a second distance from the cooling surface in the second winding direction,
   wherein the second distance is the same for all second guiding rollers.

8. The cooling apparatus according to claim 1, wherein the first winding direction extends in a first winding plane and the second winding direction extends in a second winding plane parallel to yet spaced apart from the first winding plane.

9. The cooling apparatus according to claim 8, wherein the first winding plane and the second winding plane extend perpendicular to the rotation axis.

10. The cooling apparatus according to claim 1, wherein the first guiding roller and the second guiding roller of each set are spaced apart in the circumferential direction over a spacing angle in the range of twenty to sixty degrees.

11. The cooling apparatus according to claim 1, wherein the first guiding roller and the second guiding roller of each set define a linear transition path for the continuous strip,
    wherein the first guiding roller and the second guiding roller of each set are positioned relative to the cooling surface so that the transition path is completely spaced apart from the cooling surface.

12. The cooling apparatus according to claim 1, wherein the second guiding roller of each set is aligned in the circumferential direction with the first guiding roller of a consecutive one of the sets.

13. The cooling apparatus according to claim 1, wherein the first guiding roller and the second guiding roller of each set are arranged for deflecting the continuous strip about a first deflection axis and a second deflection axis, respectively,
    wherein the first deflection axis is tilted at an oblique first angle to the rotation axis and wherein the second deflection axis is tilted at an oblique second angle to the rotation axis, opposite to the first angle.

14. The cooling apparatus according to claim 1, wherein the first guiding roller and the second guiding roller of each set are arranged for deflecting the continuous strip about a first deflection axis and a second deflection axis, respectively,
wherein the first deflection axis is perpendicular to the first winding direction and the first transition direction or wherein the second deflection axis is perpendicular to the second winding direction and the second transition direction.

15. The cooling apparatus according to claim 13,
wherein the first deflection axis and the second deflection axis correspond to the axes of the first guiding roller and the second guiding roller, respectively.

16. The cooling apparatus according to claim 1, wherein the first guiding rollers are arranged side-by-side in the axial direction.

17. The cooling apparatus according to claim 1, wherein the second guiding rollers are arranged side-by-side in the axial direction.

18. The cooling apparatus according to claim 1, wherein the cooling apparatus comprises a base for rotatably supporting the cooling drum about the rotation axis,
wherein the guiding device is supported relative to said base in a stationary angular position about the rotation axis.

19. The cooling apparatus according to claim 18, wherein the angular position is at a stationary angle within a range of zero to sixty degrees with respect to a horizontal plane.

20. The cooling apparatus according to claim 1, wherein the guiding device further comprises one or more first alignment elements for aligning the continuous strip at one or more of the first guiding rollers along an entry line.

21. The cooling apparatus according to claim 20, wherein the one or more first aligning elements are one or more first alignment rollers,
wherein each of the one or more first alignment rollers is arranged alongside one of the first guiding rollers for abutting the continuous strip in the axial direction at the entry line.

22. The cooling apparatus according to claim 21, wherein the continuous strip has an inside facing towards the cooling drum,
wherein said one or more first alignment rollers are arranged for obliquely abutting the inside of the continuous strip at the entry line.

23. The cooling apparatus according to claim 1, wherein the guiding device further comprises one or more second alignment elements for aligning the continuous strip at one or more of the second guiding rollers along an exit line.

24. The cooling apparatus according to claim 23, wherein the one or more second aligning elements are one or more first alignment rollers,
wherein each of the one or more second alignment rollers is arranged alongside one of the second guiding rollers for abutting the continuous strip in the axial direction at the exit line.

25. The cooling apparatus according to claim 24, wherein the continuous strip has an inside facing towards the cooling drum,
wherein said one or more second alignment rollers are arranged for obliquely abutting the inside of the continuous strip at the exit line.

26. The cooling apparatus according to claim 1, wherein the first guiding roller and the second guiding roller of each set define a transition path for the continuous strip,
wherein the guiding device further comprises one or more alignment elements at an intermediate position along the transition path between the first guiding roller and the second guiding roller of each set for steering the continuous strip along the respective transition path.

27. The cooling apparatus according to claim 26, wherein the one or more alignment elements comprises a first alignment roller and a second alignment roller which are oppositely inclined.

28. The cooling apparatus according to claim 1, wherein the plurality of windings comprises an infeed winding where the continuous strip is first applied to the cooling drum,
wherein the cooling apparatus comprises an infeed pulling member for feeding the continuous strip into the infeed winding at an infeed speed,
wherein the cooling apparatus further comprises a controller that is operationally connected to the cooling drum to control the rotational speed of said cooling drum,
wherein the controller is operationally connected to the infeed pulling member and controls the infeed pulling member such that the infeed speed is lower than the rotational speed of the cooling drum.

29. The cooling apparatus according to claim 28, wherein the plurality of windings comprises an outfeed winding where the continuous strip ultimately leaves the cooling drum,
wherein the cooling apparatus further comprises an outfeed pulling member for feeding the continuous strip out of the outfeed winding away from the cooling drum,
wherein the controller is operationally connected to the outfeed pulling member and controls the outfeed pulling member such that it pulls on the continuous strip at an outfeed rate that is higher than the rotational speed of the cooling drum.

30. A production line for producing a continuous strip,
wherein the production line comprises an extruder for extruding the continuous strip at a variable extrusion speed, a cooling apparatus according to claim 1 for cooling the continuous strip and a buffer between the extruder and the cooling apparatus to absorb variations in the extrusion speed,
wherein the plurality of windings comprises an infeed winding where the continuous strip is first applied to the cooling drum,
wherein the cooling apparatus comprises an infeed pulling member that is located between the buffer and the cooling drum for feeding the continuous strip into the infeed winding at an infeed speed,
wherein the production line further comprises a controller that is operationally connected to the cooling drum to control the rotational speed of said cooling drum,
wherein the controller is operationally connected to the infeed pulling member and controls the infeed pulling member such that the infeed speed is lower than the rotational speed of the cooling drum.

31. A method for cooling a continuous strip using the cooling apparatus according to claim 1, wherein the method comprises the steps of:
receiving the continuous strip from the first winding at the first guiding roller of at least one of the sets in the first winding direction;

directing the continuous strip in the first transition direction;
receiving the continuous strip at the second guiding roller of the at least one of the sets in the second transition direction; and
directing the continuous strip into the consecutive winding in the second winding direction.

\* \* \* \* \*